US008805855B2

(12) United States Patent
Sasson et al.

(10) Patent No.: US 8,805,855 B2
(45) Date of Patent: *Aug. 12, 2014

(54) EFFICIENTLY STORING AND RETRIEVING DATA AND METADATA

(75) Inventors: Ben Sasson, Yaffo (IL); Ori Shalev, Kiryat Ono (IL)

(73) Assignee: International Business Machines Corporation, Armonk, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/588,292

(22) Filed: Aug. 17, 2012

(65) Prior Publication Data
US 2014/0052691 A1 Feb. 20, 2014

(51) Int. Cl.
*G06F 17/30* (2006.01)
(52) U.S. Cl.
USPC ........... 707/749; 707/610; 707/640; 707/661; 707/736; 707/758; 711/117; 711/154
(58) Field of Classification Search
None
See application file for complete search history.

(56) References Cited

U.S. PATENT DOCUMENTS

| | | | | |
|---|---|---|---|---|
| 7,870,102 | B2 * | 1/2011 | Haustein et al. | 707/661 |
| 8,037,745 | B2 * | 10/2011 | Yang | 73/146.8 |
| 8,190,832 | B2 * | 5/2012 | Dickey et al. | 711/156 |
| 8,255,634 | B2 * | 8/2012 | Young | 711/137 |
| 8,341,350 | B2 * | 12/2012 | Jess et al. | 711/114 |
| 2008/0016128 | A1 * | 1/2008 | Haustein et al. | 707/204 |
| 2008/0282006 | A1 * | 11/2008 | Vivenzio et al. | 710/107 |
| 2009/0216707 | A1 | 8/2009 | Keohane et al. | |
| 2010/0011275 | A1 | 1/2010 | Yang | |
| 2010/0191922 | A1 * | 7/2010 | Dickey et al. | 711/154 |
| 2010/0274795 | A1 * | 10/2010 | Rallapalli et al. | 707/769 |
| 2010/0313044 | A1 * | 12/2010 | Rajpal et al. | 713/320 |
| 2011/0178983 | A1 | 7/2011 | Bernhard et al. | |
| 2011/0285732 | A1 | 11/2011 | Carter | |
| 2012/0042115 | A1 * | 2/2012 | Young | 711/6 |
| 2012/0078156 | A1 * | 3/2012 | Platz et al. | 602/76 |
| 2012/0078756 | A1 * | 3/2012 | Tsugihashi et al. | 705/27.1 |
| 2013/0041872 | A1 * | 2/2013 | Aizman et al. | 707/690 |
| 2013/0173853 | A1 * | 7/2013 | Ungureanu et al. | 711/103 |
| 2013/0185500 | A1 * | 7/2013 | Haustein et al. | 711/111 |
| 2013/0304547 | A1 * | 11/2013 | Adler et al. | 705/7.39 |

FOREIGN PATENT DOCUMENTS

| | | |
|---|---|---|
| CN | 101324898 A | 12/2008 |
| JP | 02002055995 A | 2/2002 |
| WO | WO2012012075 A1 | 1/2012 |

OTHER PUBLICATIONS

IBM "Method for large-scale metadata management using an enterprise metadata repository, a data architecture framework, and a data quality governance process", IPCOM000146562D; Feb. 16, 2007.

* cited by examiner

*Primary Examiner* — Hung Le
(74) *Attorney, Agent, or Firm* — Griffiths & Seaton PLLC (57) ABSTRACT

For efficiently storing and retrieving data and metadata in phases, in a first phase, metadata tokens, which are assigned to most active metadata-emitting entities, are used for storing the data and the metadata together in a single input/output operation while piggybacking the metadata of least active metadata-emitting entities onto one of the most active metadata-emitting entities having one of the metadata tokens. In a second phase, the metadata is re-written to a metadata delta journal for reclaiming the metadata tokens. In a third phase, the metadata journal is applied to a metadata structure containing the metadata of the storage system, the metadata delta journal is then cleared after successfully updating the main metadata structure with the metadata of the metadata journal. The metadata journal is swapped with an empty metadata journal for concurrently adding metadata while retaining the metadata journal until applying the metadata delta journal to the metadata structure.

18 Claims, 6 Drawing Sheets

FIG. 6

EFFICIENTLY STORING AND RETRIEVING DATA AND METADATA

BACKGROUND OF THE INVENTION

1. Field of the Invention

The present invention relates in general to computers, and more particularly to efficiently storing synchronized data and metadata with fast, metadata retrieval in a storage system.

2. Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems involve storing and retrieving large amounts of data and metadata.

SUMMARY OF THE DESCRIBED EMBODIMENTS

With increasing demand for faster, more powerful and more efficient ways to store information, optimization of storage technologies is becoming a key challenge. Modern storage system architectures involve significant amounts of metadata kept persistent on a back-end storage device. For example, in journaled storage systems, where data is saved in chronological order, attributes, such as logical position and chunk length, are just as critical as the data itself. In such storage systems, data and related metadata are logically inseparable, and a partial loss of metadata is often equivalent to data loss. Therefore, when implementing these systems, it is required that data and the data's related metadata are synchronized. In the current state of the art, the solutions offered for storing and retrieving metadata fail to keep the data and metadata fully synchronized, fail to store the metadata in concentrated areas that are easily retrievable, do not provide negligible I/O overhead for the metadata, and do not load the metadata and/or recover the metadata after the metadata crashes in a bounded and easily calculated time.

Accordingly, and in view of the foregoing, various exemplary method, system, and computer program product embodiments for efficiently storing and retrieving data and metadata in phases using a processor device in a computer storage system. In a first phase, metadata tokens, which are assigned to most active metadata-emitting entities, are used for storing the data and the metadata together in a single input/output operation while piggybacking the metadata of least active metadata-emitting entities onto one of the most active metadata-emitting entities having one of the metadata tokens. In a second phase, the metadata is re-written to a metadata delta journal for reclaiming the metadata tokens. In a third phase, the metadata journal is applied to a metadata structure containing the metadata of the storage system, the metadata delta journal is then cleared after successfully updating the main metadata structure with the metadata of the metadata journal. The metadata journal is swapped with an empty metadata journal for concurrently adding metadata while retaining the metadata journal until applying the metadata delta journal to the metadata structure.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, with increasing demand for faster, more powerful and more efficient ways to store information, optimization of storage technologies is becoming a key challenge. There are two basic approaches for the physical placing of metadata. One is placing metadata adjacent to its related data chunks, while the other is placing metadata in concentrated areas. This yields a tradeoff between input/output (I/O) performance and metadata load cost: choosing to place metadata adjacent to the distributed data chunk makes it difficult to find and load the information stored as metadata; placing the metadata in concentrated locations mandates issuing multiple IO commands for serving a single user IO.

A hybrid approach is one that initially stores metadata in a distributed format and migrates it to concentrated locations afterwards. In this approach, loading the metadata that has not been migrated is a complicated process: first, one must load the concentrated metadata, and then all pieces of distributed metadata have to be collected from all over the physical range. Collecting those pieces is a costly operation, impacting both warm-up time and routine I/O. These approaches fail to keep the data and metadata fully synchronized, fail to store the metadata in concentrated areas which are easily retrievable and do not load the metadata and/or recover the metadata after the metadata crashes in a bounded and easily calculated time. Thus, in order to address the inefficiencies of storing and retrieving data and metadata, the illustrated embodiments of the present invention, as mentioned above, provides a solution for efficiently storing and retrieving data and metadata in phases using a processor device in a computer storage system. In other words, a hybrid method that overcomes the drawbacks of the above-described approaches, by limiting the physical distribution of the metadata without significant impact on system throughput and latency, is illustrated below.

In a first phase, using metadata tokens (e.g., metadata write tokens) assigned to most active metadata emitting entities for storing the data and the metadata together in a single input/output (I/O) operation while piggybacking the metadata of less active metadata-emitting entities onto one of the most active metadata emitting entities having one of the metadata tokens. The degree of "most active" and "less active" may be predetermined and/or set by a user or other methods commonly known in the art. In a second phase, the metadata is re-written to a metadata delta journal for reclaiming the metadata tokens. In a third phase, the metadata delta journal is applied to a main metadata structure containing the metadata of the storage system, the metadata delta journal is then cleared after successfully updating the main metadata structure with the metadata of the metadata delta journal. To allow updates to the metadata journal while it is being applied on the main metadata structure, the metadata journal is immediately swapped with an empty one that will accumulate the ongoing metadata updates for the future main structure updates.

Figure 1:
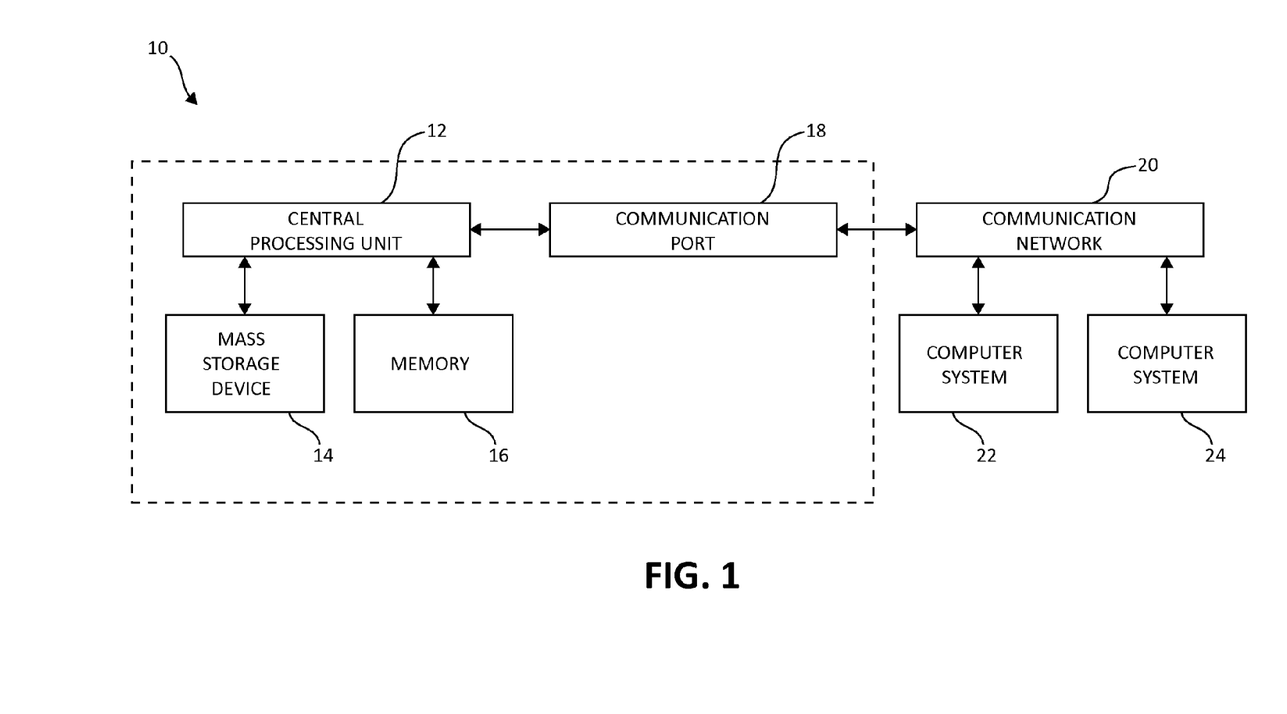
FIG. 1 is a block diagram illustrating a computing system environment having an example storage device in which aspects of the present invention may be realized.

Turning now to FIG. 1, exemplary architecture 10 of data storage systems (e.g., virtual tape systems) in a computing environment is depicted. The computer system 10 includes central processing unit (CPU) 12, which is connected to mass storage device(s) 14 and memory device 16. Mass storage devices can include hard disk drive (HDD) devices, solid-state devices (SSD) etc., which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
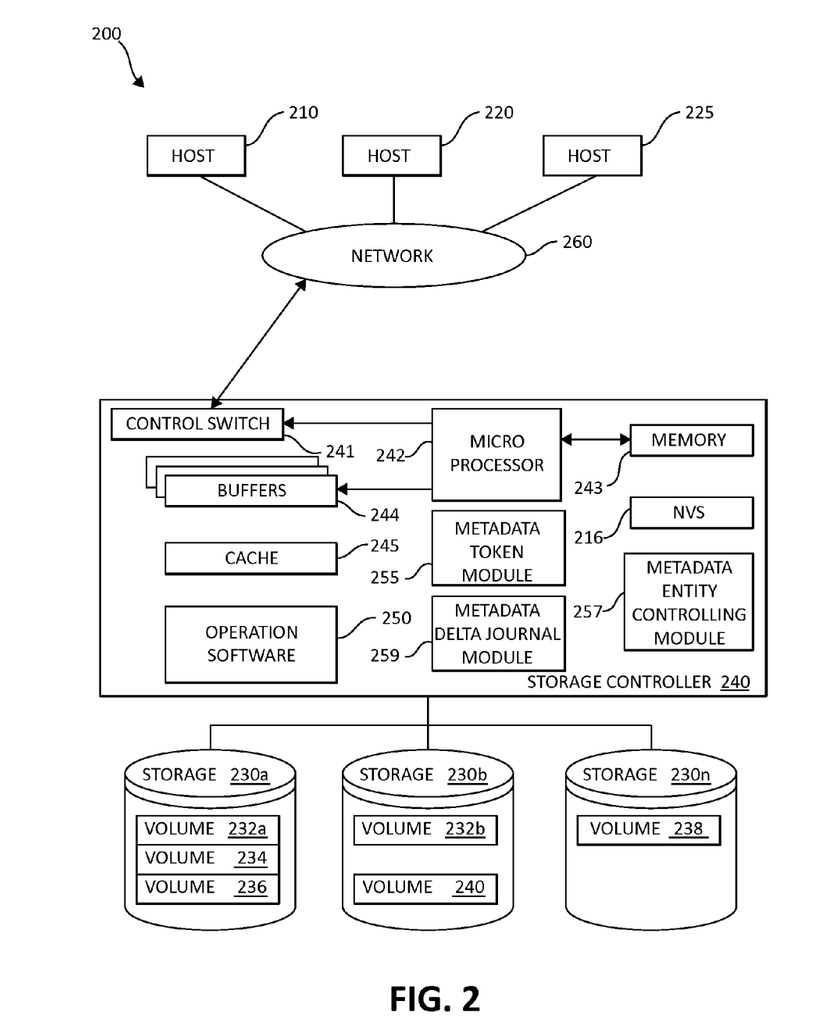
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention in a computing environment. In one embodiment, system memory 243 includes, is associated, or is in communication with the operation software 250 for in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. It should be noted that although most storage operations are, in fact, write and read requests, there are other types of operations, such as an inquiry command. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes ranks may further be divided into so-called "tracks," which represent a fixed block of storage. A track is therefore associated with a given volume and may be given a given rank.

The storage controller 240 may include a metadata token module 255, a metadata-emitting entity-controlling module 257, and a metadata delta journal module 259 in a computing environment. The metadata token module 255, the metadata-emitting-entity controlling module 257, and the metadata delta journal module 259 may work in conjunction with each and every component of the storage controller 240, the hosts 210, 220, 225, and storage devices 230. The metadata token module 255, the metadata-emitting entity-controlling module 257, and the metadata delta journal module 259 may be structurally one complete module or may be associated and/or included with other individual modules. The metadata token module 255, the metadata-emitting-entity-controlling module 257, and the metadata delta journal module 259 may also be located in the cache 245 or other components of the storage controller 240 to accomplish the purposes of the present invention. In one embodiment, the power fencing module 255 is a single, external, block that is shared by all the nodes in the cluster. The power fencing module 255 is a physical power switch, from which the cluster nodes retrieves power feeds. The software components that operate it are included in the various fence agents, 257 and 259. Because the power fencing module 255 is a physical entity, the power fencing module 255 may not be located in the cache, as the fencing agent 257 can.

The storage controller 240 may be constructed with a control switch 241 for controlling the fibre channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, the metadata token module 255, the metadata entity-controlling module 257, and the metadata delta journal module 259 on which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network adaptor (this could be a fibre channel) 260 as an interface i.e., via at least one switch called "fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, the metadata token module 255, the metadata-emitting-entity-controlling module 257, and the metadata delta journal module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the present invention provides a solution for efficiently storing and retrieving data and metadata in phases using a processor device in a computer storage system. In one embodiment, for the three major phases (as described above) in the life cycle of metadata elements are illustrated and defined below. In the first phase, referred to as a "distributed metadata phase", user and/or system triggered processes, which are referred to herein as "metadata emitting entities" and/or "metadata entities", provide metadata pieces with or without a related data piece. The Metadata elements refer to the metadata pieces emitted by the entities. Each metadata element has a life cycle, spanning from emitting it, through migrating it, to applying it on the concentrated metadata structure. The metadata pieces are stored together with either their related data piece or a non-related piece, which happens to be written during the same time. Choosing between those two options depends on the availability of a resource referred to herein as "metadata write token(s)" and/or "metadata token(s)". If the metadata emitting entity, by which the data and metadata are handled, is associated with such token, the metadata piece is allowed to be stored together with the data. Otherwise, the metadata "piggy-backs" on another metadata entity among those metadata entities that are associated with a metadata token. Piggybacking is similar to hitchhiking—two different and separate entities which share the same or similar destination and one of them, which lack the ability to move on its own, uses the other as a transportation method towards destination. Here, piggybacking is used to describe the process in which one metadata piece, emitted by an entity lacking a metadata token, "rides" a valid token of another entity to reach its destination, such as the NVS. These metadata tokens are limited (bounded) in number. Limiting the overall number of active metadata tokens reduces the dispersion of metadata on the physical device, which in turn leads to improved metadata load time. The association of metadata write tokens with contexts is dynamic and depends on the I/O rate at which the contexts operate: the more loaded contexts are more likely to hold a token. Altering a set of metadata token associations involves a persistent update that will be described later. The set of active tokens is a set of limited and well-known sizes. The contents of the set itself are changeable using the method described here. There are no "non-active" token sets, since there are no "non-active" tokens—each metadata entity either holds a token or it does not. Revoked tokens are only an intermediate step in the process of swapping the current tokens set to another.

In the second phase, metadata elements are re-written to a journal of metadata elements, called "metadata delta journal". The metadata write tokens may be reclaimed, but only after all of their associated metadata elements have moved to the second phase and re-written in the metadata delta journal. The moving or graduating to the second phase means the metadata is written to the metadata journal.

In the third phase, the metadata delta journal is applied on a persistent data structure containing the system's metadata in an easily accessed form, called "main metadata structure". It should be noted that there is a fundamental difference in the metadata structure between first and second stages and third stage. On the first and second stages, metadata is stored as a journal, which means all the changes are written as they sequentially arrive. Although this method is Input/Output (I/O) efficient, it is not efficient when loading the metadata since all metadata pieces written to the journal have to be replayed to generate the final in-memory data structure. To reduce this CPU load, the third stage represents the persistent metadata without retaining its journal history, and it is a snapshot of the persistent metadata that can be easily loaded into memory. The term "apply" here implicates the present invention is to update the affected metadata structure and emit the affected metadata structure to a NVS so the affected metadata structure can be easily loaded if needed.

After successfully updating this structure, the metadata delta journal is cleared. In order to enable adding metadata elements to the metadata delta journal concurrently to the main metadata structure update, prior to the update, the metadata delta journal is swapped with an empty metadata delta journal and retains the old one until it is fully applied on the main metadata structure, which is the third stage.

Each metadata emitting entity follows the rules (phases) of the metadata life cycle as described above: metadata is either written to the device together with data, or piggy-backs on another entity holding a valid metadata write token. In case the entity is performing a synchronized (blocking) write (or blocking metadata write), the operation is considered as completed only when both data and related metadata have been successfully written.

Figure 3:
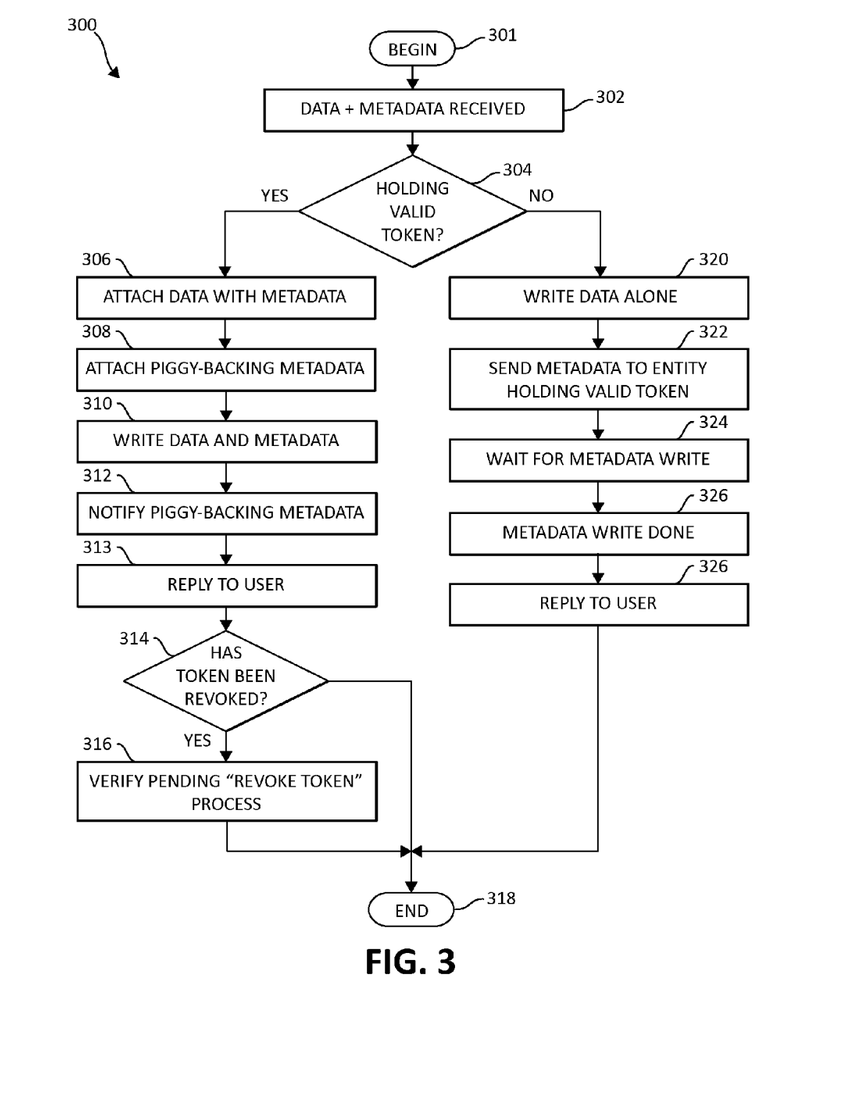
FIG. 3 is a flowchart illustrating an exemplary method for a metadata emitting process.

Turning now to FIG. 3, a flowchart illustrating an exemplary method 300 for a metadata emitting process is depicted. The method 300 is only describing the first phase and by the end of the method 300, both data and metadata are persistent on a NVS as pare of the data stream. There are two main branches to the method 300. On one of the branches (e.g., a left hand side), the method 300 holds a valid metadata write token, so the method 300 allows the data to attach the data's own metadata and others data's metadata elements. The attaching means that each metadata piece will be written to the same location the data and metadata of the entity the metadata piggybacked onto were written. When the write is completed, it is the processes' (e.g., method 300) responsibility to notify the piggybacking metadata entities/processes that their metadata was successfully stored. If the token has been revoked since the beginning of method 300, there may be a "Revoke Token" process waiting for the token to be available. On the other side of the branch (e.g., on the right hand side), the current process does not hold a valid metadata token; so the metadata entity has to rely on metadata entities holding a metadata token to do the metadata write operation. It should be noted that method 300 can only reply to the user after both data and metadata have been successfully stored. With this background, the method 300 begins (step 301) by receiving data and metadata (step 302). The method 300 determines if there are any metadata entities holding a valid metadata token (step 304). If are any metadata entities holding a valid metadata token, the method will attach the data with the metadata (step 306). The method 300 attaches (e.g., piggy-backs) the metadata of a metadata entity, which does not have a valid metadata token, to a metadata entity holding a valid metadata token (step 308). The data and the metadata are written (step 310). The metadata pieces is now stored in two separate locations: 1) as part of the data stream emitted by the token holding entity and 2) in memory as part of the pending write metadata journal. A reply to the user is sent indicating the data and the metadata has been successfully stored (step 313). The method 300 then determines if any of the metadata tokens have been revoked (step 314). If yes, the method 300 notifies a pending "revoke token" process that one of the metadata tokens has been revoked (step 316). If no, the method 300 ends (step 318). However, as mentioned above, there are two concurrently flowing branches. Returning to step 304, if there are any metadata entities not holding a valid metadata token, the data belonging to these metadata entities, which are not holding a valid metadata token, are written alone without the metadata (step 320). However, the method 300 will send the metadata to a metadata entity holding a valid metadata token and will piggyback this metadata (step 322). The method 300 will then wait for the metadata to be written (step 324). The metadata is written and completed (step 326). The metadata entity/user is sent a reply indicating the metadata has been successfully written (step 328). The method 300 then ends (step 318).

Figure 4:
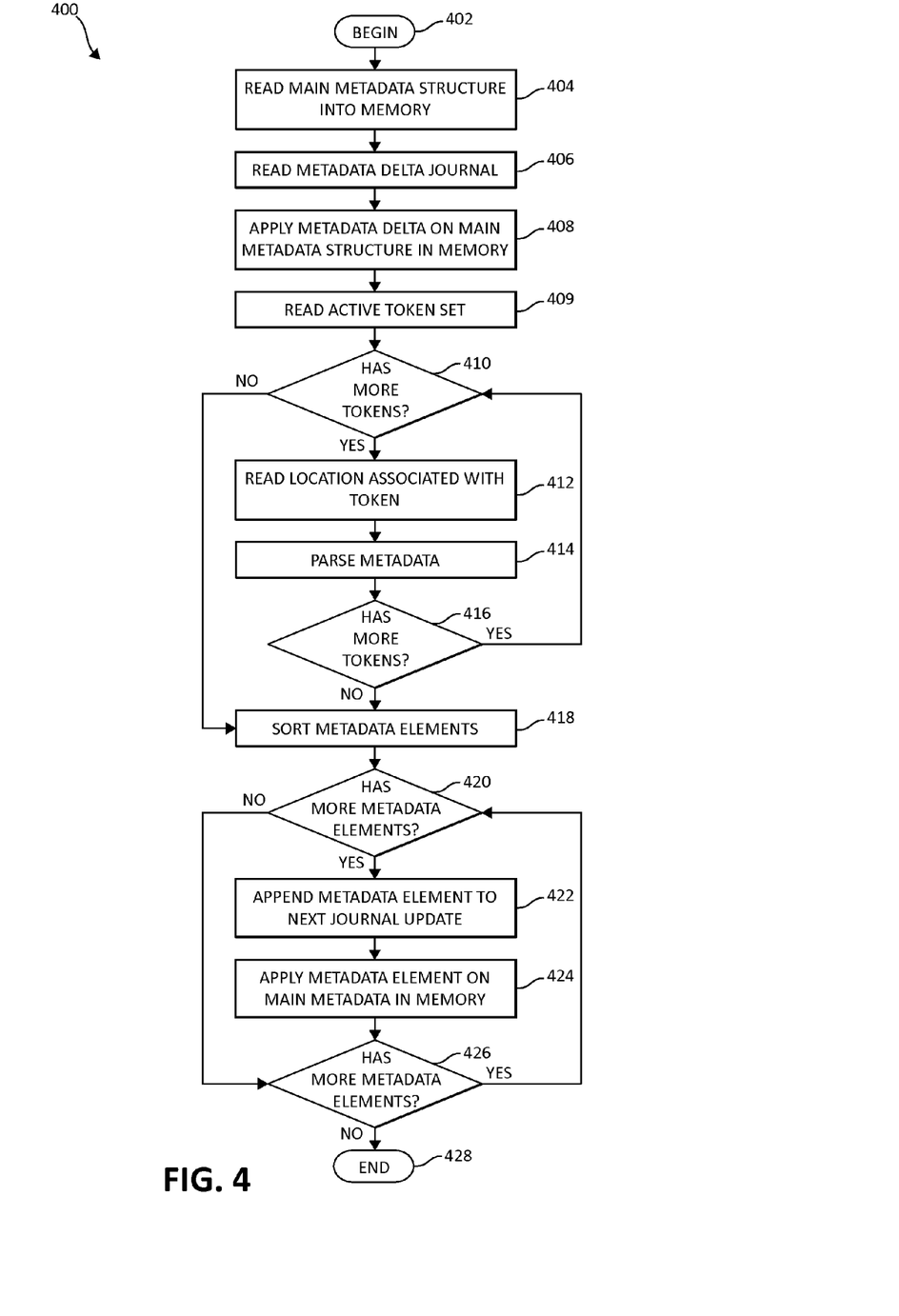
FIG. 4 is a flowchart illustrating an exemplary method for loading the metadata and recovering the metadata from a system crash.

It may be necessary to load the metadata and/or recover from a crash. As will be described below in FIG. 4, the metadata in a main metadata structure is loaded into a memory. The load and recovery in not one of the metadata life-cycle phases, but is the overall name for the process of reconstructing the in-memory metadata structure after improper system shutdown (e.g., the system did not migrated all of the metadata to the third stage). The metadata delta journal is applied on the main metadata. Since the metadata delta journal may have been partially applied prior to the crash, the metadata delta journal may contain elements that have already been applied on the main structure. Two approaches are viable: in one, all metadata elements should support "double replay", i.e. applying them twice in the same order is equivalent to applying them once. In the other, already applied elements must be detected and not re-applied. The set of active metadata write tokens are read. For each token, the metadata elements written in its associated physical locations are read. Those metadata elements are sorted by a key, corresponding to the metadata's elements original order, and the metadata elements are applied on the main metadata structure in memory, and are enqueued for a next metadata delta journal update. FIG. 4 illustrates the process of loading the system metadata into an in-memory structure. During this process, some of the metadata has to be recovered from phases earlier than the third phase.

FIG. 4 a flowchart illustrating an exemplary method 400 for loading the metadata and recovering the metadata from a system crash. The method 400 begins (step 402) by reading the main metadata structure into memory (step 404). The metadata delta journal is read (step 406). The metadata delta journal is applied on the main metadata structure in memory (step 408). The active set of metadata tokens are read (step 409). The method 400 determines if there are more metadata tokens (step 410). If yes, the method 400 reads the location associated with the metadata tokens (step 412). The metadata is then parsed (step 418). The method 400 again determines if there are more metadata tokens (step 416). If there are no more metadata tokens, from either step 410 and/or from step 416, the method 400 continues and sorts the metadata elements (step 418). The metadata elements are sorted in chronological order according the origin of creation of the metadata. The method 400 then determines if there are more metadata elements (step 420). If yes, the method 400 appends the metadata elements to the next metadata delta journal update (step 422). The metadata element is applied on the main metadata in the memory (step 424). The method 400 then determines again if there are more metadata elements (e.g., metadata entities) (step 426). If yes, the method 400 returns to step 410. If there are not more metadata elements, from either step 410 or step 426, the method 400 ends (step 428).

In one embodiment, as described above, first, persistent main metadata structure is loaded into memory. The metadata delta journal is then read and applied on the persistent main metadata structure. Locating the metadata elements of phase one, the persistent active token set is read. Next, the metadata elements are read from the locations associated with the active metadata tokens. Metadata elements are sorted by chronological order of their original creation, appended to the journal, and then applied on the in-memory main metadata structure (e.g., persistent main metadata structure).

As mentioned above, the number of metadata write tokens are limited in number. The number of active metadata write tokens directly affects the load time, which is the reason why the metadata write tokens are limited. As such, it is necessary to manage and maintain the active metadata write tokens. It is probable that the number of metadata emitting entities in the computing system is larger than the number of metadata write tokens. In such case, some of these metadata emitting entities are not allowed to store metadata on their own, but rather, these metadata emitting entities must piggy-back on any of the these metadata emitting entities holding a metadata write token. A carrier token-holding entity (e.g., a metadata emitting entity holding a metadata write token) is selected as the metadata emitting entity holding a metadata write token that is the closest/nearest to issuing an actual write operation.

To optimize system performance, metadata write tokens are ideally granted to the most loaded metadata emitting entities (e.g., the most active metadata emitting entities). This ensures that the impact on latency is minimal. When the load on metadata emitting entities significantly changes, the tokens association is changed to reflect the changes. A metadata token may only be reclaimed after all of metadata elements associated with the metadata token graduated from the first phase. Switching the current set of active tokens with a new set is described below.

For each metadata token to be revoked, the metadata token is marked to prevent the metadata token from being used with new metadata. Once all metadata elements associated with the revoked tokens graduate from the first phase, the active metadata token set can be swapped. (It should be noted for implementation that swapping between two persistent metadata token sets can be performed atomically using methods like double-buffering.)

Figure 5:
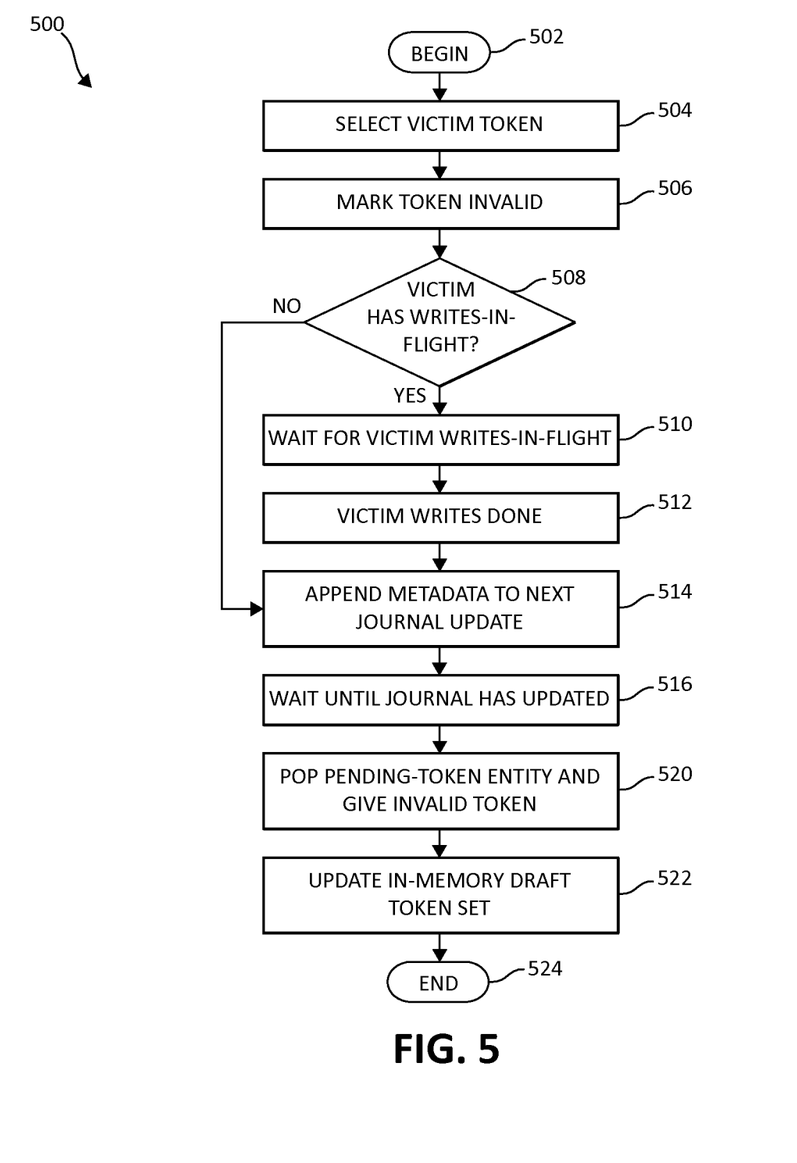
FIG. 5 is a flowchart illustrating an exemplary method for revoking a metadata token.

As illustrated below in FIG. 5, the process of revoking a single token from a metadata emitting entity, which has become less loaded (e.g., less active) than other metadata emitting entities, is described. FIG. 5 a flowchart illustrating an exemplary method 500 for revoking a metadata token. The method 500 begins (step 502) by selecting a "victim" metadata token (e.g., an identified metadata token that has become less active) (step 504). The method 500 marks the metadata token as invalid (step 506). The method 500 determines if the victim metadata token has any writes-in-flight (e.g., any write operations that are needing to be or are being processed) (step 508). If yes, the method 500 waits for the write operations to be completed for the victim metadata token (step 510). The method 500 completes the write operations are for the victim metadata token (step 512). If no, the method 500 appends the metadata to the next metadata delta journal update (step 514).

The method 500 waits until the metadata delta journal has been updated (step 516). The method 500 pops a pending-token entity and gives an invalid metadata token (step 520). The method 500 updates the in-memory draft token sets (step 522). The method 500 ends (step 524).

FIG. 5 may be summarized as followed. First, the metadata token is marked as invalid so no new metadata elements will use the marked metadata token. If there are any active metadata writes using the marked metadata token, a wait operation is performed allowing for the active metadata writes to complete. The present invention then ensures that all metadata elements written using the marked metadata token reach the second phase by appending all metadata elements to the metadata delta journal. Then, a metadata emitting process, which is more active/loaded and deserving of the metadata write token, is selected and assign the marked/revoked metadata token, still in invalid state. This new assignment is updated in the in-memory draft of the to-be-applied metadata token set.

Figure 6:
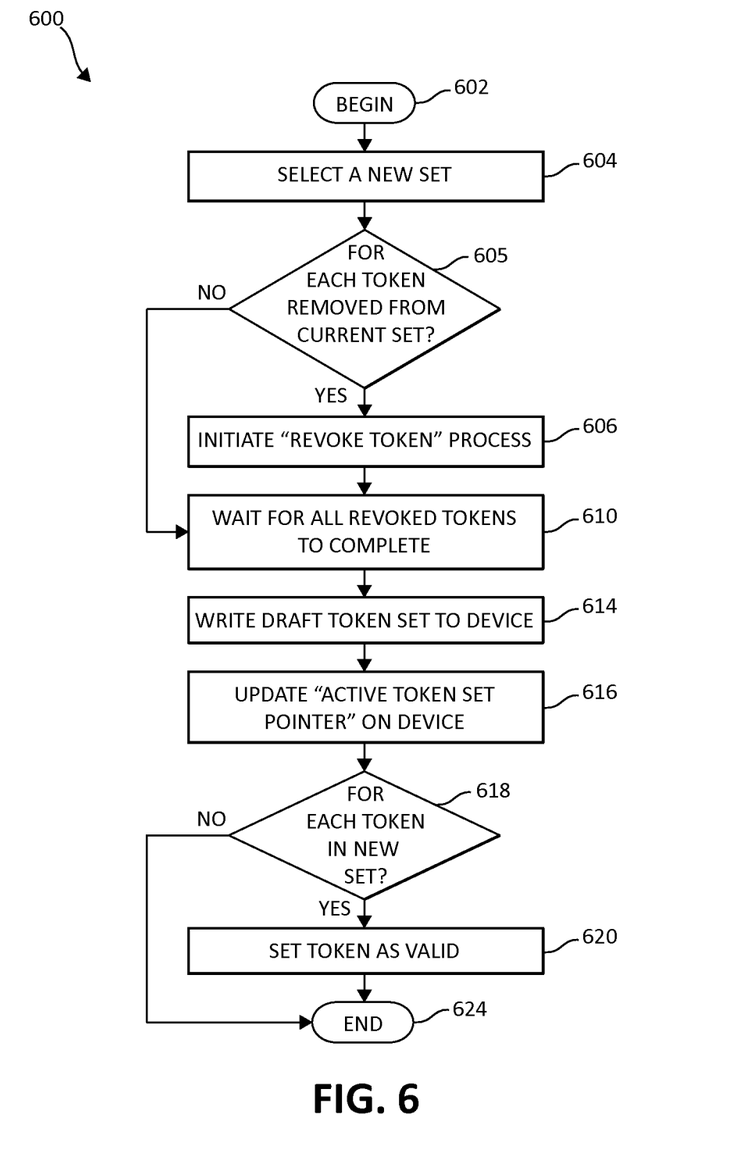
FIG. 6 is a flowchart illustrating an exemplary method swapping metadata tokens with new metadata tokens.

In one embodiment, as described below in FIG. 6, the process of swapping the current metadata token set with a new metadata token set, is described. Turning now to FIG. 6, flowchart illustrating an exemplary method 600 for swapping metadata tokens with new metadata tokens is illustrated. The method 600 begins (step 602) by selecting a new one and/or set of metadata tokens (step 604). The method 600 determines if there are metadata tokens that each need to be removed from the current set of metadata tokens that are selected (step 605). If yes, the method 600 initiates a "revoke token" process (see FIG. 5 method) for the metadata tokens that need to be removed (step 606). When there are no further metadata tokens that need to be removed from the current set of metadata tokens that are selected, from step 605, the method 600 waits for the all the revoked metadata tokens to complete any of the I/O operations (step 610). The method 600 writes a draft token set to a device (step 614). The method 600 updates an active metadata token set pointer" on the device (step 616). The method 600 then determines, for each metadata token in the new set, if there are any metadata tokens that are invalid (step 618). If yes, the method 600 sets the metadata token as valid (step 620). If there are not any metadata tokens that are invalid, the method ends (step 624).

FIG. 6 may be summarized as followed. First, a "revoke token" process is executed for each one of the metadata write tokens that are no longer a part of new metadata token set. When all of the revoke token processes are executed for each one of the metadata write tokens have completed, a draft set of the new metadata token set is written to the device, and then in an atomic update, an "active token set pointer" on a disk is updated to the location of the newly stored new metadata token set. All invalid metadata write tokens present on the new metadata token set are re-validated. It should be noted that metadata tokens shared between the old metadata token set and new metadata token set can be used ordinarily during this procedure, that is, they do not go through the revoke-token process, so the metadata emitting entities holding those tokens are allowed to keep emitting metadata with their I/O's.

The cluster management "cman" is a collection of items that make a central cluster membership and messaging system more usable. The capturing node (not shown) may continue loading/initializing 410 other needed kernel modules, such as RAID modules. In order for the crash kernel to load quickly enough and operate this flow of events, the crash kernel needs to be as "thin" as possible, i.e. include only necessary modules (drivers) for it to start, and send the panic message. Then, once the failed node is known it will not be fenced. At this point, time becomes insignificant to load other modules required to dump the vmcore file. One of these modules is the driver needed to access the disk we want to write the file to.

The loading/initializing 410 stage is not time sensitive and can take several minutes. The panicking node 402 dumps 412 the memory to disk, using a kdump operation, saving a virtual memory (VM) core file on the local file system. Once the crash file dump 412 has been successfully captured by a capturing node, which was loaded to the cluster, a "panic mode completion" message 414 is sent. The surviving node 406 logs 422 the panic mode completion message 414. Having sent the "panic mode completion" message 414, the panicked node 402 reboots 416 itself. After the reboot 416 the panicked node 402 raises an alert, which can be used for various monitoring functions. It should be noted that the same logic/steps used here for the 2 nodes cluster configuration in FIG. 4 may be further extended to be used in a cluster having multiple nodes. This may be accomplished by modifying the messaging method to use multicast, thus send the panic message to all members of the cluster. The messaging protocol can either send the panic message to a specific node, according to its IP address, or to a group of nodes. Sending to a specific IP address is called unicast. Sending to a group of nodes is called multicast. Sometimes multicast is referred to as broadcast, although it is not exactly the same.

At this point, and in connection with the crashing node, the lower level component details of the secondary kernel (and/or capturing kernel) are illustrated. The capturing node is loaded into the cluster to capture the crash dump file belonging to the crashing node. The capturing node, (e.g., secondary node's kernel) should support the hardware platform, by including as many modules that handle the hardware components as possible. For example, in Linux, module is the term used for what is more commonly known as drivers. Since the drivers are used to "connect" between the OS and the hardware it is running on, have as many of them enables the kernel to load on a wider variety of servers and their associated H/W components, such as network card, etc. It is critical that the network related modules are compiled into the kernel. The surviving kernel supports the kdump feature, and the overall target boot time for secondary/surviving kernel and the file system, is less than 4 seconds. The secondary kernel is a specially configured and a compiled version of the mainline kernel (it may not be the mainline kernel and could be any Linux Kernel), such as the mainline Linux kernel 3.1.0, illustrated by way of example only. In order to be used as a dump-capture kernel, the following options should be available on the kernel: 1) the kernel is relocatable (e.g., a relocatable kernel is a kernel that can be loaded from different memory addresses as opposed to non-relocatable kernels, that must be located in a specific address in the memory space. This is required for the crash kernel image to reside in a different location than the primary kernel, and still can be loaded), 2) the kernel has kexec feature compiled-in (the kexec mechanism is what actually loads the crash kernel. It is used by the kdump facility, 3) the kernel has the support for /dev/oldmem and /proc/vmcore, which is needed to convert the memory image to a dump file, 4) the kernel enable "kernel crash dumps" (the kernel needs to be capable of accessing storage, in order to save the dump file, and 5) the kernel is capable of being compiled as single-processor kernel, which is a general recommendation for kexec. Kexec is a fastboot mechanism that allows booting a kernel (e.g., a Linux kernel) from the context of an already running kernel without going through the BIOS. The BIOS can be very time consuming, especially on big servers with numerous peripherals. This can save a lot of time for developers who end up booting a machine numerous times, as well as users that require rebooting servers. The crash dump is captured from the context of a freshly booted kernel and not from the context of the crashed kernel. Kdump uses the kexec to boot into a second kernel whenever the system crashes. This second kernel (e.g., the capture kernel), boots with very little memory and captures the dump image. The first kernel reserves a section of memory that the second kernel uses to boot. In order to support as much configurations as possible and reduce the post-boot user space module loading, most the device drivers are built into the kernel. Only slow device drivers will be handled as modules and loaded after the secondary kernel is up.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer programs products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A system for efficiently storing and retrieving data and metadata in a plurality of phases in a storage system, the system comprising:
    at least one processor device, for storing and retrieving the data and metadata in the plurality of phases, wherein the at least one processor device:
        in a first phase, uses metadata tokens assigned to most active metadata-emitting entities for storing the data and the metadata together in a single input/output (I/O) operation while piggybacking the metadata of least active metadata-emitting entities onto one of the most active metadata-emitting entities having one of the metadata tokens; and
        in a second phase, re-writes the metadata to a metadata delta journal for reclaiming the metadata tokens.

2. The system of claim 1, wherein the metadata tokens are limited in numbers and each are included in an active token set.

3. The system of claim 1, wherein the at least one processor device performs in a third phase at least one of:
    applying the metadata delta journal to a main metadata structure containing the metadata of the storage system,
    clearing the metadata delta journal after successfully updating the main metadata structure with the metadata of the metadata delta journal, and
    swapping the metadata delta journal with an empty metadata delta journal for concurrently adding metadata while retaining the metadata delta journal until applying the metadata delta journal to the main metadata structure.

4. The system of claim 1, wherein the at least one processor device performs at least one of:
    sending a notification to the least most active metadata-emitting entities indicating the metadata that was piggybacking onto one of the most active metadata-emitting entities has been successfully stored, and
    if one of the metadata tokens has been revoked, notifying a pending revoke metadata token process that is waiting for one of the metadata tokens to become available.

5. The system of claim 3, wherein the at least one processor device, for one of loading and recovering the metadata from crash operation, performs at least one of:
    loading the main metadata structure into a memory,
    reading the metadata delta journal,
    applying the metadata delta journal to the main metadata structure, wherein if the metadata delta journal has been at least partially applied to the main metadata structure the at least one processor device performs at least one of:
        applying the metadata elements twice in the same order, wherein the metadata supports a double replay, and
        detecting the metadata which has been previously applied to the main metadata structure, and only applying the metadata from the metadata delta journal which has not been previously applied,
    reading each of the metadata tokens and the metadata from locations associated with the metadata tokens,
    sorting the metadata in a chronological order according to a time of creation, and
    appending the metadata to a next update to the metadata delta journal.

6. The system of claim 1, wherein the at least one processor device, for piggybacking the metadata of least active metadata-emitting entities onto one of the most active metadata-emitting entities having one of the metadata tokens, selects one of the most active metadata-emitting entities that is closest to issuing a write operation.

7. The system of claim 6, wherein the at least one processor device performs one of:
    revoking one of the metadata tokens from one of the most active metadata-emitting entities that has become less active, and
    swapping an active set of the metadata tokens with a new active set of the metadata tokens.

8. The system of claim 7, wherein the at least one processor device, for revoking one of the metadata tokens, performs one of:

marking the one of the metadata tokens as invalid to prohibit use by the metadata, waiting for any active metadata write operations to complete, ensuring the metadata that is written reach a second phase by appending the metadata to the metadata delta journal, selecting an alternative one of the most active metadata-emitting entities, which is waiting for one of the metadata tokens to be assigned, for assigning the one of the metadata tokens that is revoked, and updating an active token set with a new assignment of the metadata tokens.

9. The system of claim 7, wherein the at least one processor device, for swapping the active set of the metadata tokens with the new active set of the metadata tokens, performs one of:

executing a revoke metadata token process for each one of the metadata tokens that are not part of the new active set of the metadata tokens, waiting for each of the metadata tokens that are revoked to be completed, writing the new active set of the metadata tokens to the metadata delta journal, updating an active token set pointer to a location of the new active set of the metadata tokens, and revalidate each of the metadata tokens that are invalid on the new active set of the metadata tokens.

10. A computer program product for efficiently storing and retrieving data and metadata in a plurality of phases in a storage system using a processor device, the computer program product comprising a non-transitory computer-readable storage medium having computer-readable program code portions stored therein, the computer-readable program code portions comprising:

a first executable portion that:

in a first phase, uses metadata tokens assigned to most active metadata-emitting entities for storing the data and the metadata together in a single input/output (I/O) operation while piggybacking the metadata of least active metadata-emitting entities onto one of the most active metadata-emitting entities having one of the metadata tokens, and in a second phase, re-writes the metadata to a metadata delta journal for reclaiming the metadata tokens.

11. The computer program product of claim 10, wherein the metadata tokens are limited in numbers and each are in included in an active token set.

12. The computer program product of claim 10, further including a second executable portion that performs in a third phase at least one of:

applying the metadata delta journal to a main metadata structure containing the metadata of the storage system, clearing the metadata delta journal after successfully updating the main metadata structure with the metadata of the metadata delta journal, and swapping the metadata delta journal with an empty metadata delta journal for concurrently adding metadata while retaining the metadata delta journal until applying the metadata delta journal to the main metadata structure.

13. The computer program product of claim 12, further including a third executable portion that, for one of loading and recovering the metadata from crash operation, performs at least one of:

loading the main metadata structure into a memory, reading the metadata delta journal, applying the metadata delta journal to the main metadata structure, wherein if the metadata delta journal has been at least partially applied to the main metadata structure, performing at least one of:

applying the metadata elements twice in the same order, wherein the metadata supports a double replay, and detecting the metadata which has been previously applied to the main metadata structure, and only applying the metadata from the metadata delta journal which has not been previously applied, reading each of the metadata tokens and the metadata from locations associated with the metadata tokens, sorting the metadata in a chronological order according to a time of creation, and appending the metadata to a next update to the metadata delta journal.

14. The computer program product of claim 10, further including a second executable portion that performs at least one of:

sending a notification to the least most active metadata-emitting entities indicating the metadata that was piggybacking onto one of the most active metadata-emitting entities has been successfully stored, and if one of the metadata tokens has been revoked, notifying a pending revoke metadata token process that is waiting for one of the metadata tokens to become available.

15. The computer program product of claim 10, further including a second executable portion that, for piggybacking the metadata of least active metadata-emitting entities onto one of the most active metadata-emitting entities having one of the metadata tokens, selects one of the most active metadata-emitting entities that is closest to issuing a write operation.

16. The computer program product of claim 15, further including a third executable portion that performs one of:

revoking one of the metadata tokens from one of the most active metadata-emitting entities that has become less active, and swapping an active set of the metadata tokens with a new active set of the metadata tokens.

17. The computer program product of claim 16, further including a fourth executable portion that, for revoking one of the metadata tokens, performs one of:

marking the one of the metadata tokens as invalid to prohibit use by the metadata, waiting for any active metadata write operations to complete, ensuring the metadata that is written reach a second phase by appending the metadata to the metadata delta journal, selecting an alternative one of the most active metadata-emitting entities, which is waiting for one of the metadata tokens to be assigned, for assigning the one of the metadata tokens that is revoked, and updating an active token set with a new assignment of the metadata tokens.

18. The computer program product of claim 16, further including a fourth executable portion that, for swapping the active set of the metadata tokens with the new active set of the metadata tokens, performs one of:

executing a revoke metadata token process for each one of the metadata tokens that are not part of the new active set of the metadata tokens, waiting for each of the metadata tokens that are revoked to be completed, writing the new active set of the metadata tokens to the metadata delta journal, updating an active token set pointer to a location of the new active set of the metadata tokens, and revalidate each of the metadata tokens that are invalid on the new active set of the metadata tokens.

* * * * *